United States Patent
Okihara

(10) Patent No.: US 8,125,691 B2
(45) Date of Patent: Feb. 28, 2012

(54) INFORMATION PROCESSING APPARATUS AND METHOD, COMPUTER PROGRAM AND COMPUTER-READABLE RECORDING MEDIUM FOR EMBEDDING WATERMARK INFORMATION

(75) Inventor: Kenichi Okihara, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 738 days.

(21) Appl. No.: 12/243,480

(22) Filed: Oct. 1, 2008

(65) Prior Publication Data
US 2009/0097699 A1    Apr. 16, 2009

(30) Foreign Application Priority Data

Oct. 11, 2007  (JP) .................................. 2007-265826
Sep. 16, 2008  (JP) .................................. 2008-237188

(51) Int. Cl.
*H04N 1/40* (2006.01)
*G06K 9/00* (2006.01)

(52) U.S. Cl. .......... 358/3.28; 358/1.9; 358/2.1; 358/3.1; 358/1.4; 358/1.8; 358/2.99; 358/3.01; 358/3.02; 358/1.12; 358/1.14; 358/1.16; 358/1.18; 358/501; 358/515; 358/529; 358/535; 358/426.06; 382/100; 382/232; 382/135; 382/137; 382/160; 382/165; 382/171; 382/172; 382/175; 382/195; 382/248; 382/250; 382/274; 382/284; 380/22; 380/43; 380/51; 380/54; 380/201; 380/203; 380/223; 380/226; 380/228; 380/229; 380/250; 380/278

(58) Field of Classification Search ........................ None
See application file for complete search history.

(56) References Cited

U.S. PATENT DOCUMENTS

| | | | | |
|---|---|---|---|---|
| 5,228,100 | A * | 7/1993 | Takeda et al. ................. | 382/175 |
| 6,782,509 | B1 | 8/2004 | Hirayama et al. | |
| 7,458,015 | B2 * | 11/2008 | Wang ............................. | 715/229 |
| 2003/0149936 | A1 * | 8/2003 | Tamaru ......................... | 715/515 |

FOREIGN PATENT DOCUMENTS

| | | |
|---|---|---|
| JP | 2000-99501 | 4/2000 |
| JP | 2005-253004 | 9/2005 |

* cited by examiner

*Primary Examiner* — Steven Kau
(74) *Attorney, Agent, or Firm* — Fitzpatrick, Cella, Harper & Scinto

(57) ABSTRACT

A watermark information embedding apparatus generates a document image from electronic document data that has been input thereto, modifies the electronic document data based upon the document image and embeds information in the electronic document data. The apparatus includes a document image generator for generating a document image from the electronic document data; a document analyzer for detecting layout information of each constituent image in the generated document image; a normalization information calculation unit for calculating normalization information, which is for normalizing placement of each constituent image, based upon the detected layout information; a modification unit for modifying the electronic document data; and an embedding unit for embedding information in the modified electronic document data.

10 Claims, 17 Drawing Sheets

F I G. 5
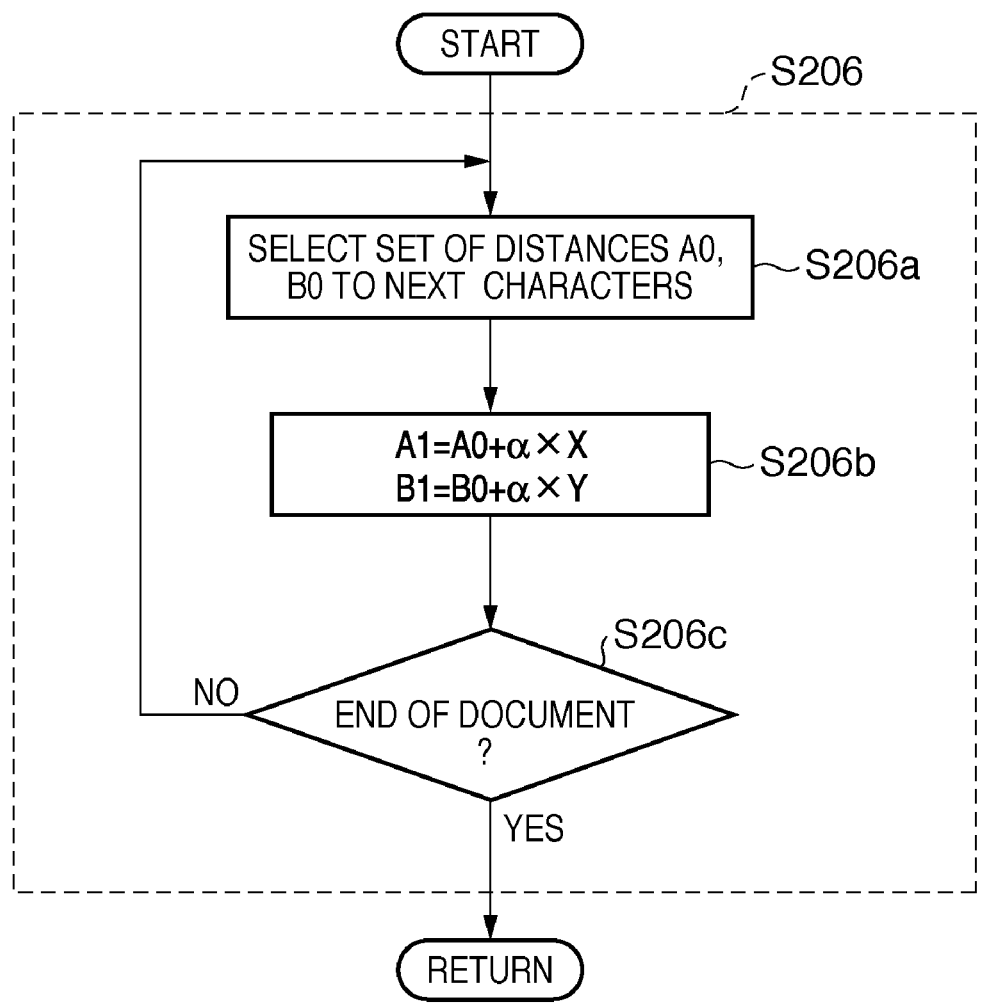

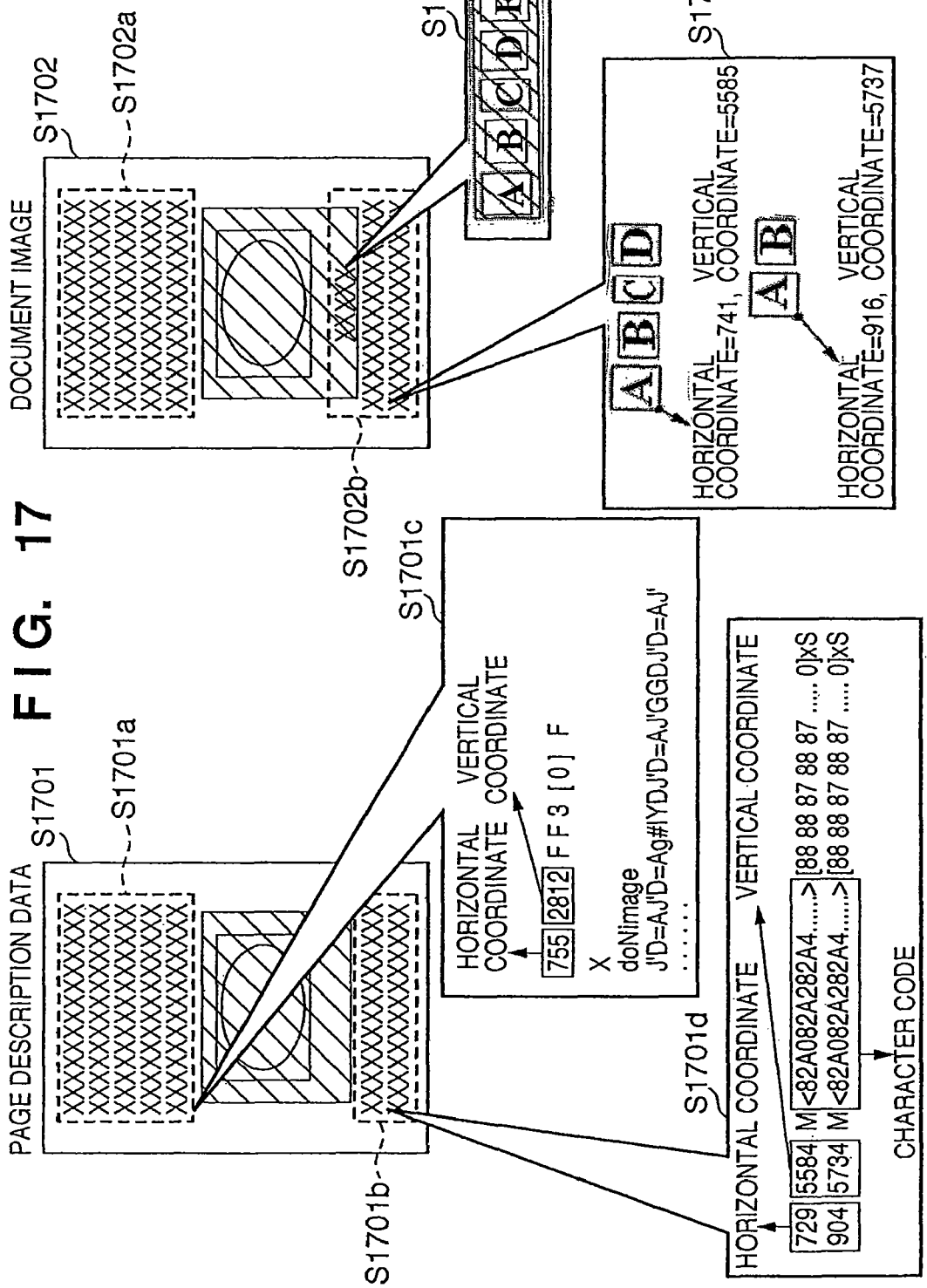

INFORMATION PROCESSING APPARATUS AND METHOD, COMPUTER PROGRAM AND COMPUTER-READABLE RECORDING MEDIUM FOR EMBEDDING WATERMARK INFORMATION

BACKGROUND OF THE INVENTION

1. Field of the Invention

The present invention relates to a technique for embedding information in a document.

2. Description of the Related Art

Techniques for embedding information in documents and then extracting the embedded information (referred to generally as "watermark information") are useful in order to enhance the security of documents.

For example, watermark information is embedded in a document image by adjusting the positions at which character images are placed, and the resulting document image is output as a print document. The print document that has been output is captured by a scanner or the like, whereby the watermark information is extracted from the document image as a document image [see the specification of Japanese Patent Application Laid-Open No. 2005-253004 (Document 1)]. This method is such that resistance to copying is high because the positions at which the character images are placed are difficult to change by copying.

On the other hand, there is a technique in which watermark information is embedded by changing the layout information of electronic document data that includes text described in page description format, after which the watermark information is extracted from the electronic document data [see the specification of Japanese Patent Application Laid-Open No. 2000-99501 (Document 2)]. The electronic document data described in a page description format is a language for specifying output with respect to a printer. Characters and figures, etc., can be printed at an optimum character quality and image quality that conform to each printer. This is being utilized in ordinary laser printers. Since the method of Document 1 performs the embedding of watermark information in a document image, printing at optimum character quality and image quality cannot be achieved. Accordingly, the embedding of watermark information in electronic document data described in a page description format is believed to be necessary.

However, the technique described in Document 1 embeds watermark information in a document image and it is necessary to make a conversion from a document image to electronic document data in order to produce an output as electronic document data. When this conversion is made, block selection and optical character recognition (referred to as "OCR" below) are carried out. However, there are instances where character spacing varies owing to the influence of error ascribable to OCR or the effects of hinting processing for improving character quality at the time of rendering processing for outline fonts. As a consequence, since the watermark information is embedded in a document image and the electronic data is converted after the watermark information is embedded, there are instances where the embedded watermark information cannot be extracted correctly. In addition, the conversion involves a large amount of processing.

On the other hand, the technique described in Document 2 embeds watermark information in electronic document data. When this is output as a print document, therefore, there are many cases where watermark information identical with the watermark information that has been embedded in the electronic document data of the document image cannot be extracted.

SUMMARY OF THE INVENTION

Accordingly, an object of the present invention is to provide an information embedding technique that makes possible the embedding of watermark information, which manipulates placement of constituent images, in electronic document data as well as the extraction of the embedded watermark information from the print document.

According to one aspect of the present invention, there is provided an information processing apparatus for embedding information in electronic document data that has been input thereto, comprises: image generating means for generating a document image from the electronic document data; detecting means for detecting layout information of each constituent image in the generated document image; calculating means for calculating normalization information, which is for normalizing placement of each constituent image, based upon the detected layout information; and embedding means for modifying the electronic document data based upon the calculated normalization information and embedding information in the modified electronic document data.

According to another aspect of the present invention, there is provided an information processing method of embedding information in electronic document data that has been input, comprises: an image generating step of generating a document image from the electronic document data; a detecting step of detecting layout information of each constituent image in the generated document image; a calculating step of calculating normalization information, which is for normalizing placement of the constituent images, based upon the detected layout information; and an embedding step of modifying the electronic document data based upon the calculated normalization information and embedding information in the modified electronic document data.

In accordance with the present invention, there can be provided an information embedding technique that makes possible the embedding of watermark information, which manipulates placement of constituent images, in electronic document data as well as the extraction of the embedded watermark information from the print document.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flowchart illustrating the procedure of operations performed by a modification unit according to the first embodiment;

FIG. 17 is a diagram illustrating coordinates of lines in page description data and in a document image.

DESCRIPTION OF THE EMBODIMENTS

Embodiments of the present invention will be described in detail with reference to the accompanying drawings.

First Embodiment

Figure 1:
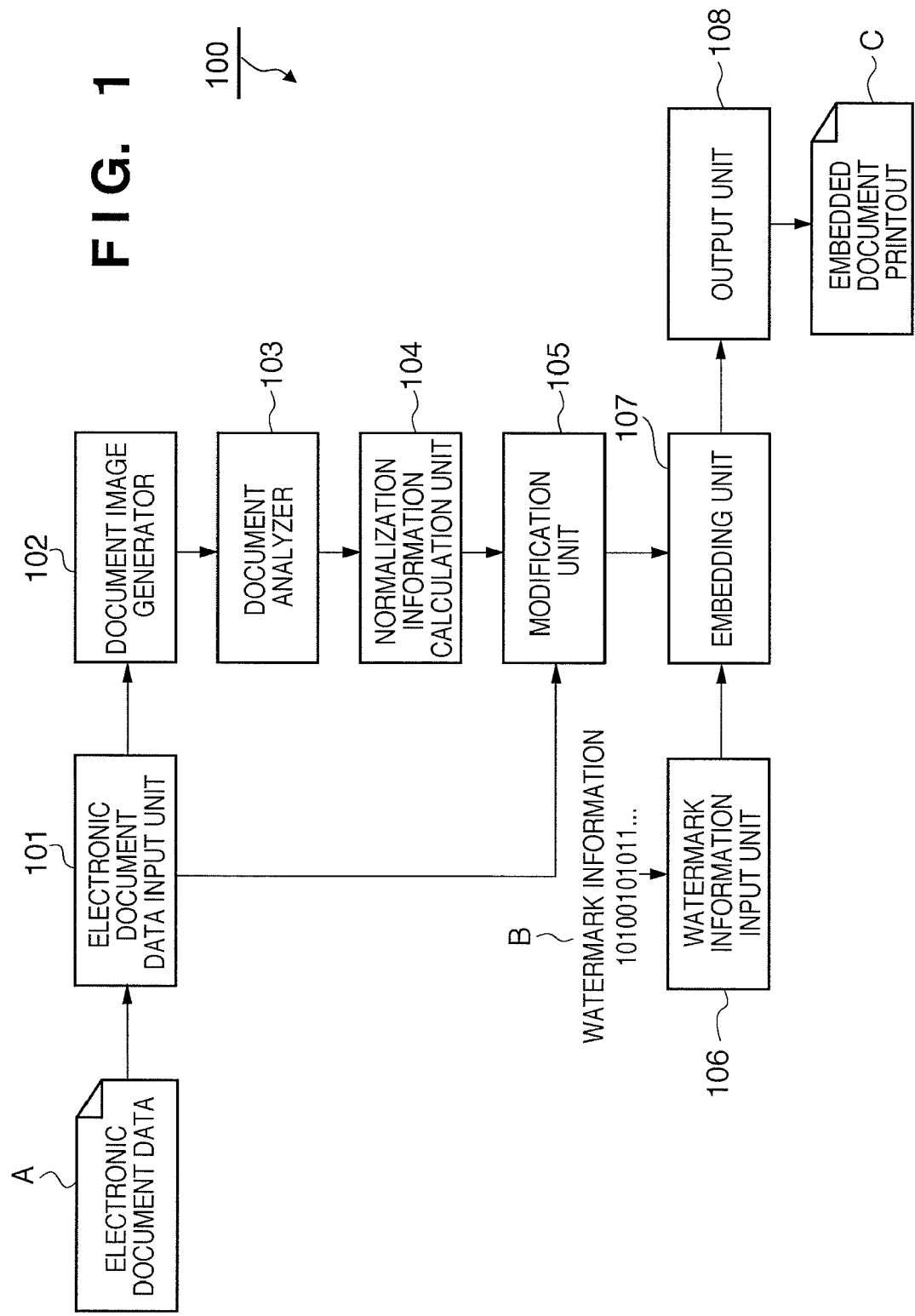
FIG. 1 is a functional block diagram of a watermark information embedding apparatus according to first and second embodiments of the present invention.

FIG. 1 is a conceptual block diagram of a watermark information embedding apparatus 100 according to first and second embodiments of the present invention.

The watermark information embedding apparatus (information processing apparatus) 100 generates a document image from electronic document data A that has been input thereto, modifies the electronic document data A based upon the document image and embeds watermark information B in the electronic document data A. It is assumed that the document image is image data (e.g., bitmap data) containing characters and that the electronic document data is text data other than this data.

The watermark information embedding apparatus 100 has an electronic document data input unit 101 for inputting electronic document data A having a page description format (referred to as "page description data" below); a document image generator 102 for generating a document image from the page description data A that has been input by the electronic document data input unit 101; a document analyzer 103 for detecting layout information relating to a circumscribing rectangle of each character image in the document image generated by the document image generator 102; and a normalization information calculation unit 104 that calculates normalization information for normalizing spacing between a circumscribing rectangle of interest (referred to as a "rectangle of interest" below) and a circumscribing rectangle neighboring the rectangle of interest based upon the layout information generated by said document analyzer 103.

The electronic document data that has been input by the electronic document data input unit 101 is modified by a modification unit 105 based upon the normalization information. The apparatus further includes a watermark information input unit 106 for inputting watermark information B; an embedding unit 107 for embedding the watermark information B by adjusting the normalized spacing of the electronic document data based upon the watermark information B that has been input from the watermark information input unit 106; and an output unit 108 for producing an output as an embedded document printout C in which the watermark information B has been embedded.

Figure 2:
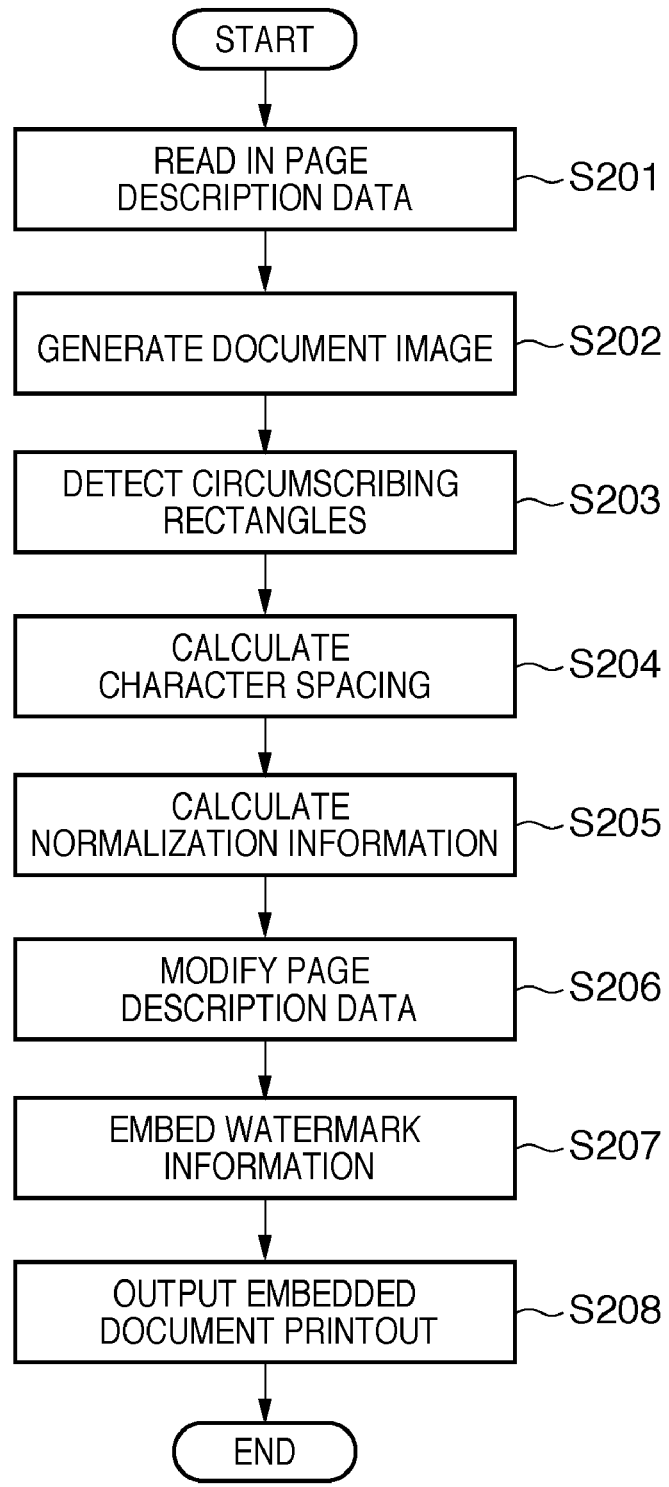
FIG. 2 is a flowchart illustrating the procedure of operations performed by the watermark information embedding apparatus of the first and second embodiments.
Figure 3:
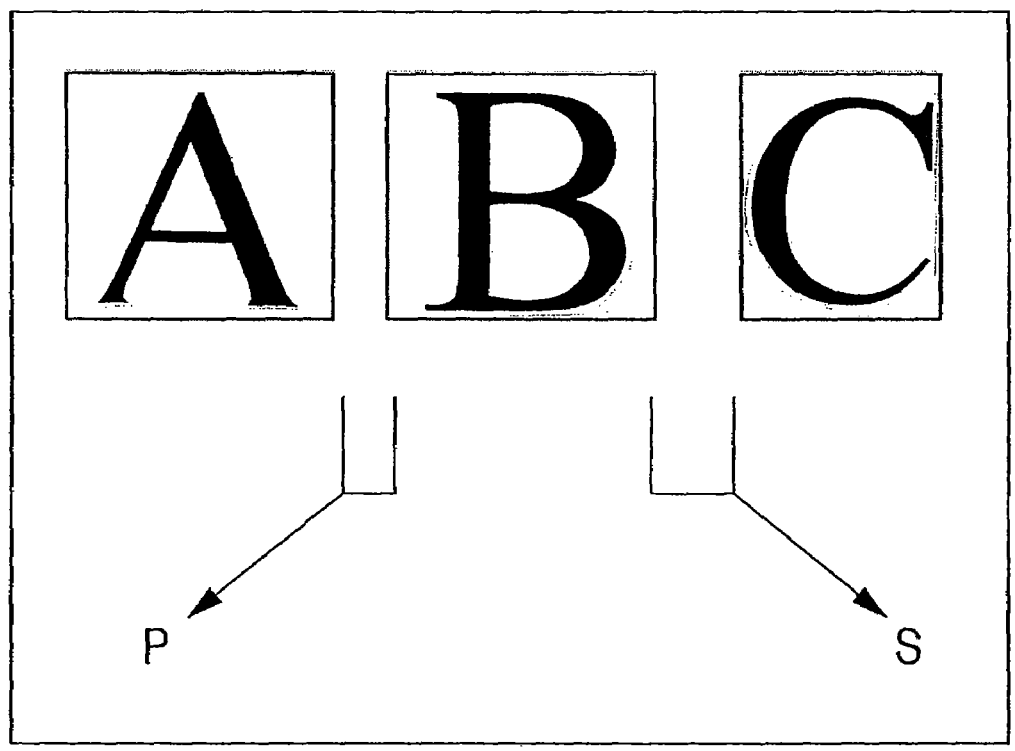
FIG. 3 is a diagram illustrating an example of a set of character spacings.

FIG. 2 is a flowchart illustrating the procedure of operations performed by the watermark information embedding apparatus 100 of the first and second embodiments, and FIG. 3 is a diagram illustrating an example of a set of character spacings.

First, in step S201, the page description data A is input to the electronic document data input unit 101. The page description data A is data for instructing a printer to render and for presenting a display on a monitor. Examples that can be mentioned are PS (Post Script), XPS (XML Paper Specification) and PDF (Portable Document Format). It should be noted that although an example of page description data is illustrated here, the present invention is applicable also to electronic document data other than page description data, for example, a text file, etc.

In step S202, a document image is generated from the page description data A by the document image generator 102. It should be noted that the resolution of the document image may be made lower than a stipulated resolution at the time of generation if the normalization information can be calculated without error. This means that processing speed can be raised and that a memory area for storing images can be reduced. For example, resolution create_dpi at the time of generation can be set as follows: First, a document image is generated from several items of page description data and a minimum value space_min of character spacing, described below, is found. Then, the lowest resolution that can be set that is above a value obtained by dividing a stipulated resolution order_dpi by space_min is adopted as the resolution create_dpi at the time of generation. In other words, if it is assumed that order_dpi is 600 dpi and that space_min is 4, then create_dpi will be 600/4=150 dpi. With this method, the smallest character spacing will not vanish and become imperceptible owing to a reduction in size. Accordingly, normalization information can be calculated without error.

Circumscribing rectangles (character areas) are detected from the generated document image in step S203. As illustrated in FIG. 3, a circumscribing rectangle is a rectangle that circumscribes a character. Originally, a circumscribing rectangle indicates an area for performing character recognition. In watermark information technology, however, it indicates a character area that is to undergo an embedding operation.

When detecting circumscribing rectangles, the method includes first projecting each pixel value of the document image onto a vertical coordinate axis, searching for blank portions (portions devoid of characters, which are black in color), discriminating lines and dividing the image into the lines. This is followed by projecting the document image onto a horizontal coordinate axis line by line, searching for blank portions and dividing the lines into character units. As a result, it is possible to cut out each character by a circumscribing rectangle and the circumscribing rectangles can be detected.

In a case where circumscribing rectangles have thus been detected, the character spacing of the document image is calculated in step S204 from the circumscribing rectangles. It should be noted that character spacing is the spacing between a rectangle of interest and circumscribing rectangle adjacent thereto, as illustrated at P or S in FIG. 3. Then, based upon the character spacing calculated at step S204, normalization information for normalizing the character spacing is calculated at step S205. The details of step S205 will be described later.

In step S206, the page description data is modified based upon the normalization information calculated at step S205. The details of step S206 will be described later. Next, in step S207, the watermark information B to be embedded is input from the watermark information input unit 106 and the watermark information B is embedded by adjusting the character spacing of the modified page description data. The details of step S207 will be described later.

Finally, in step S208, the embedded document printout C in which the watermark information B has been embedded is output.

[Normalization Information Calculation Unit 104 (Step S205)]

Figure 4:
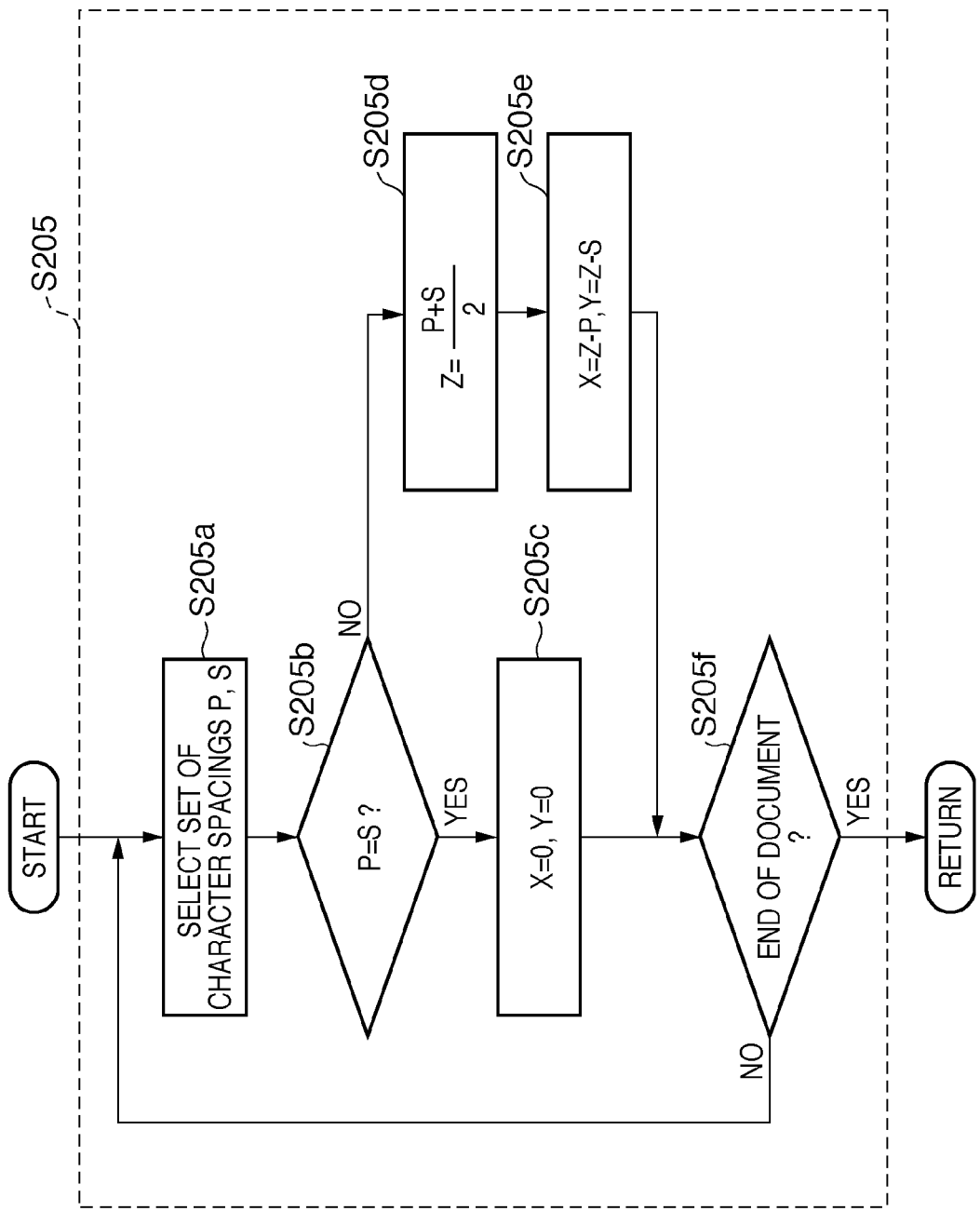
FIG. 4 is a flowchart illustrating the procedure of operations performed by a normalization information calculation unit according to the first embodiment.

FIG. 4 is a flowchart illustrating the procedure of operations performed by the normalization information calculation unit 104 according to the first embodiment. Processing executed by the normalization information calculation unit 104 adjusts the character spacing between the rectangle of interest and an adjacent circumscribing rectangle (referred to as a "preceding rectangle" below) preceding the rectangle of interest and between the rectangle of interest and an adjacent circumscribing rectangle (referred to as a "succeeding rectangle" below) succeeding the rectangle of interest. As illustrated in FIG. 3, P represents the character spacing between the rectangle of interest and the preceding rectangle, and S represents the character spacing between the rectangle of interest and the succeeding rectangle.

First, in step S205a in FIG. 4, the set of character spacings P and S preceding and succeeding the rectangle of interest is selected. For example, if the number of circumscribing rectangles on a certain line is 30 (it should be noted that the number of characters is not necessarily 30), then even-numbered circumscribing rectangles excluding the circumscribing rectangles at both ends of the line are focused upon with regard to P and S.

Figure 14:
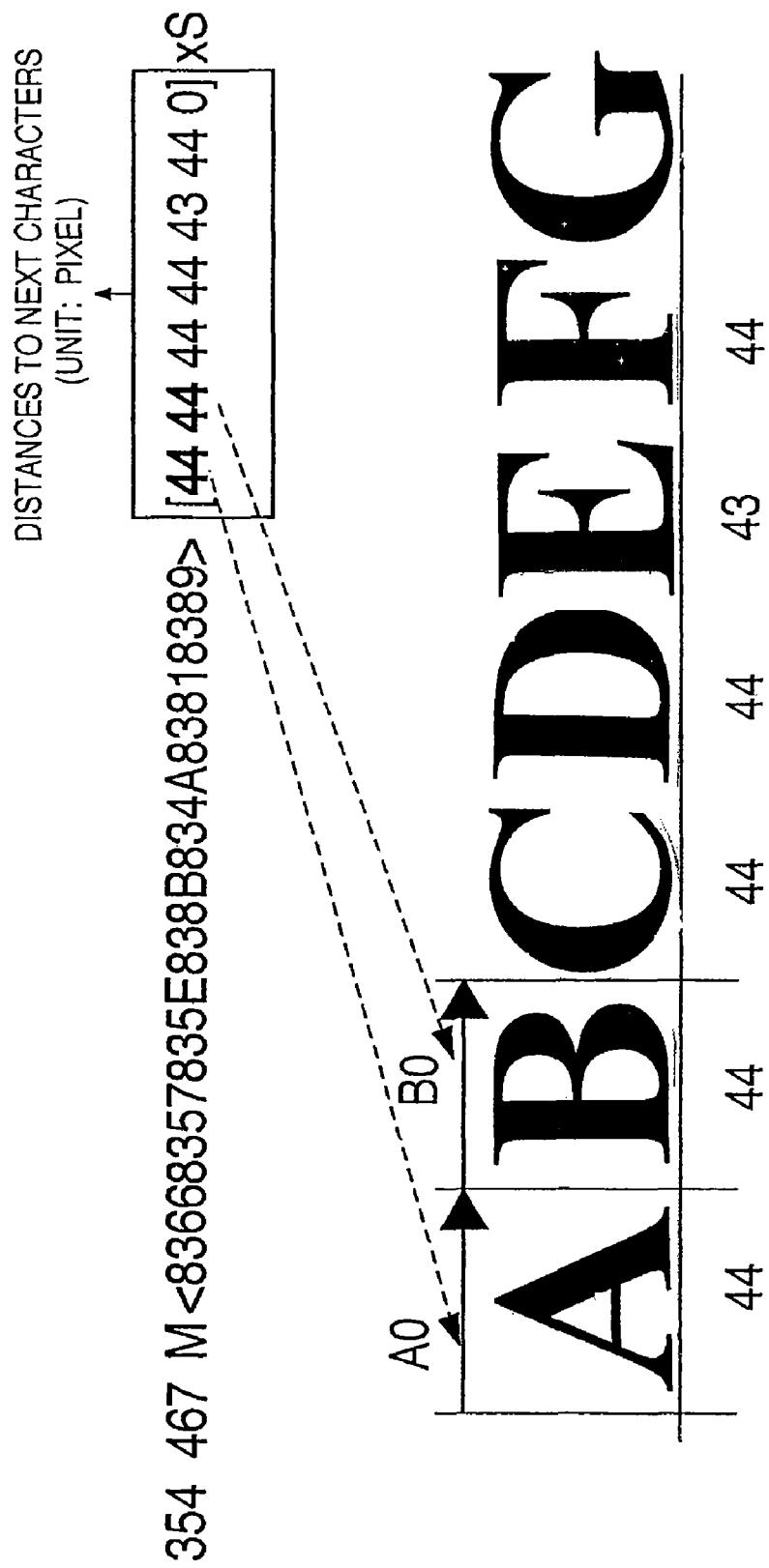
FIG. 14 is a diagram illustrating the relationship between a character and distance to the next character in page description data according to the first embodiment.

In page description data A that has been input from the electronic document data input unit 101, A0, B0 are adopted as distances to the next characters, these distances corresponding to the above-mentioned character spacings P, S and being values that enable manipulation of the character spacings in the page description data. It should be noted that A0, B0 are represented as numerical values in page description data 601, as illustrated for example in FIG. 6. Further, as shown in FIG. 14, A0 indicates the distance from the rendering-start position of character "テ" to the rendering-start position of character "ジ". The distance is 44 pixels. It should be noted that depending upon the type of page description data, the character spacing is not the distance to the next character and may be the character spacing per se in the page description data. However, it goes without saying that so long as the value enables the character spacing to be manipulated, the present invention can be applied.

Next, in step S205b, it is determined whether the values of P and S are equal. Control proceeds to step S205c if it is determined in step S205b that the values of P and S are equal, and to step S205d if it is determined in step S205b that the values of P and S are not equal.

In step S205c, values of X, Y, which represent items of normalization information corresponding to A0, B0, respectively, which are values in the page description data, are made 0.

In step S205d, an average value $Z=(P+S)/2$ of the values of the character spacings P and S are calculated. In a case where fractional numbers are not used in the character spacings of the page description data A, digits to the right of the decimal point of value Z are discarded and rounding-up processing, etc., is executed.

In step S205e, X, Y are calculated as $X=Z-P$, $Y=Z-S$, respectively, using the values of P, S and the value of Z.

Finally, in step S205f, it is determined whether the rectangle of interest is the final circumscribing rectangle of the document image. Step S205 is exited if it determined that the rectangle of interest is the final circumscribing rectangle, and control returns to step S205a if it determined that the rectangle of interest is not the final circumscribing rectangle.

[Modification Unit 105 (Step S206)]

FIG. 5 is a flowchart illustrating the procedure of operations performed by the modification unit 105 according to the first embodiment. The modification unit 105 modifies the distance to the next character based upon the calculated normalization information mentioned above. As a result, the character spacing in the page description data is normalized.

First, in step S206a, the modification unit 105 selects distances A0, B0 to the next characters, which constitute character information corresponding to the set P, S of preceding and succeeding character spacings.

Next, in step S206b, distances A1, B1 to the next characters after modification are calculated as $A1=A0+\alpha \times X$, $B1=B0+\alpha \times Y$, respectively, and the data content is modified. Here α represents a coefficient that associates the document image with the page description data. It may be a preset value or a value that is input anew.

Finally, in step S206c, it is determined whether the character information corresponding to P, S is the final character information. Step S206 is exited if it is determined in step S206c that the character information is the final character information, and control returns to step S206a if it is determined in step S206c that the character information is not the final character information.

Since character spacing is normalized as described above, embedding is possible even if character-spacing information is not obtained from the page description data.

[Embedding Unit 107 (Step S207)]

Figure 15:
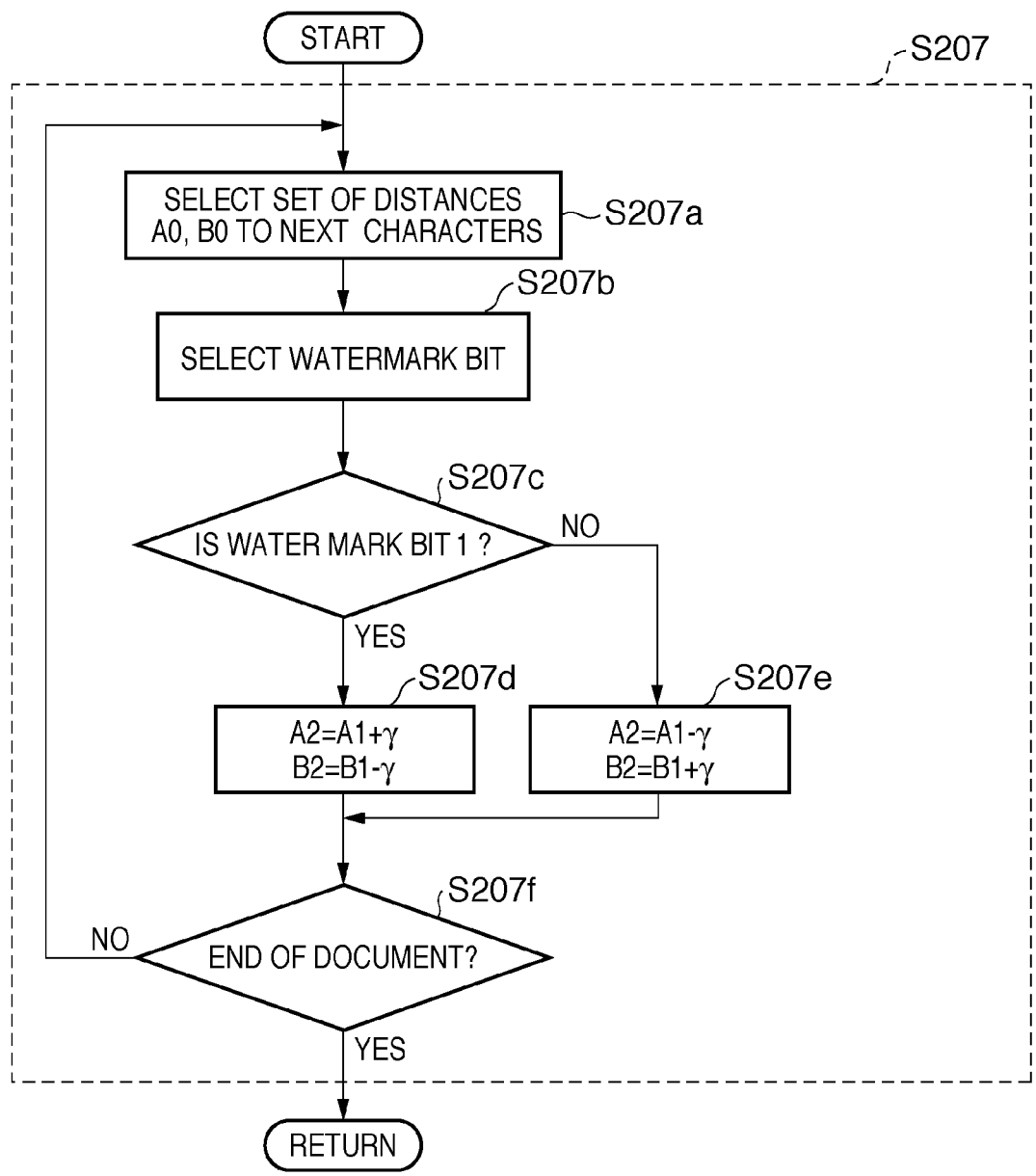
FIG. 15 is a flowchart illustrating the procedure of operations performed by the embedding unit according to the first embodiment.

FIG. 15 is a flowchart illustrating the procedure of operations performed by the embedding unit 107 according to the first embodiment. The embedding unit 107 manipulates the size relationship between the preceding and succeeding character spacings in the page description data using distances to the next characters and inserts the watermark information B into the page description data A.

First, in step S207a, distances A1, B1 to the next characters are selected. In step S207b, a watermark bit to be embedded is selected from the bit string of the watermark information B that has been input from the watermark information input unit 106. In this embodiment, the watermark information B is composed of a string of "0" or "1" bits.

Next, in step S207c, it is determined whether the watermark bit selected and embedded in step S207b is a "1". If it is determined in step S207c that the embedded watermark bit is "1", then, in step S207d, embedding of watermark information is performed in such a manner that the character spacing corresponding to A1 will become larger than the character spacing corresponding to B1. That is, distances A2, B2 up to the next characters after embedding are calculated as A2=A1+γ, B2=B2−γ, respectively, and the embedding of the watermark information is performed. Here γ represents any positive value.

On the other hand, if it is determined in step S207c that the embedded watermark bit is not "1", that is, if it is determined that the embedded watermark bit is "0", then control proceeds to step S207e. Here embedding of watermark information is performed in such a manner that the character spacing corresponding to A1 will become smaller than the character spacing corresponding to B1. That is, distances A2, B2 up to the next characters after embedding are calculated as A2=A1−γ, B2=B2+γ, respectively, and the embedding of the watermark information is performed. It should be noted that the increasing or decreasing of the distances to the next characters is manipulated by γ, which is any positive value, in steps S207d and S207e. As a result, an effect similar to an operation that would move the rectangle of interest in the document image is obtained.

By adjusting the size relationship between the preceding and succeeding character spacings in the page description data in this way, one bit of watermark information ("0" or "1") is inserted for every set of character spacings. For example, in a case where there are 30 characters on one line, 14 (=30/2−1) bits of the watermark information B can be embedded.

In this embodiment, the watermark information B is embedded in page description data by adjusting the positions of even-numbered characters. However, since it will suffice if positions are adjusted at adjacent characters, the watermark information B may just as well be embedded in page description data by adjusting the positions of odd-numbered characters.

Further, in this embodiment, the watermark information B is embedded every other character. That is, one character that is not to undergo embedding is provided between characters that do undergo embedding. The reason for this is that if the watermark information B were to be embedded at successive characters one after another, one character spacing would be shared by mutually adjacent characters. An additional reason is that what would be capable of being controlled would always be the distance to the next one character. Consequently, error would gradually accumulate and this would have a major effect upon layout (the character placement information). It should be noted, however, that so long as the method is one that embeds information using character spacing, then the present invention is not limited to the procedure described.

Finally, in step S207f, it is determined whether the character information in the page description data is the final information. Step S207 is exited if it is determined in step S207f that the character information in the page description data is the final information, and control returns to step S207a if it is determined in step S207f that the character information in the page description data is not the final information.

Figure 6:
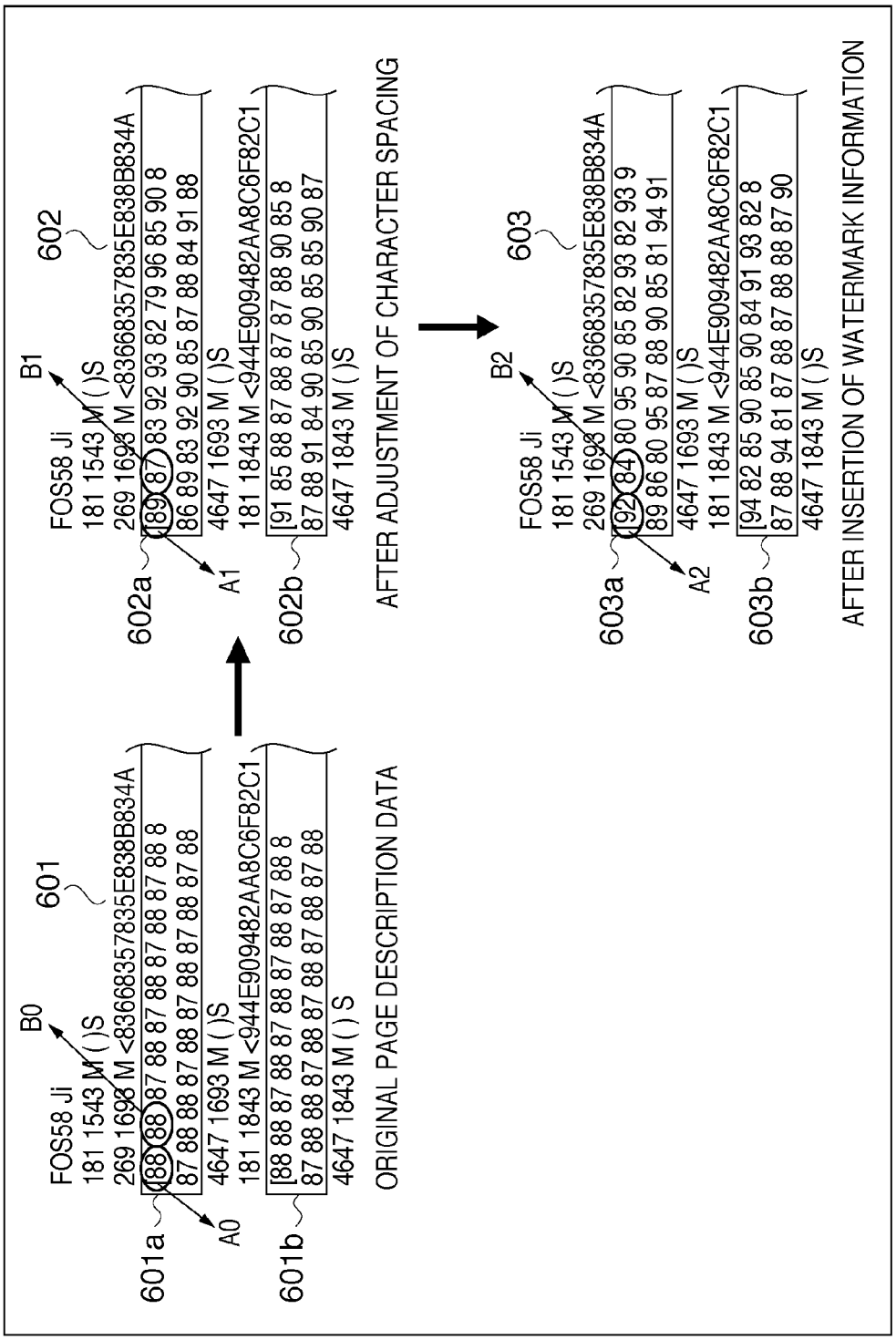
FIG. 6 is a diagram illustrating an example of a change in page description data according to the first embodiment.

FIG. 6 is a diagram illustrating an example of a change in page description data according to this embodiment. First, electronic document data that has been applied to the electronic document data input unit 101 is input. An example of the electronic document data that is input is the page description data 601. Further, in the page description data 601, portions indicating distances to next characters, these distances being values that enable manipulation of the character spacings P and S mentioned above, are portions indicated by distance data 601a, 601b, respectively, indicative of distances to the next characters. Here the description will focus upon the distances A0, B0 to the next characters selected arbitrarily from within the distance data 601a, 601b indicative of distances to the next characters.

Next, in the modification unit 105, the electronic document data is modified based upon normalization information for normalizing character spacing in the document image. An example of modified page description data is page description data 602. Portions in the page description data 602 that correspond to the distance data 601a, 601b to the next characters are distance data 602a, 602b, respectively, to the next characters. Further, portions corresponding to the distances A0, B0 to the next characters are distances A1, B1 to the next characters. It will be understood that the distances to the next characters have been modified from A0 to A1 and from B0 to B1.

Next, in the embedding unit 107, the watermark information B is embedded in the electronic document data modified in the modification unit 105. An example of electronic document data after the embedding of watermark information is page description data 603. Portions in the page description data 602 that correspond to the distance data 602a, 602b to the next characters are 603a, 603b, respectively. Further, portions corresponding to the distances A1, B1 to the next characters are distances A2, B2 to the next characters. It will be understood that the distances to the next characters have been modified from A1 to A2 and from B1 to B2.

Figure 7:
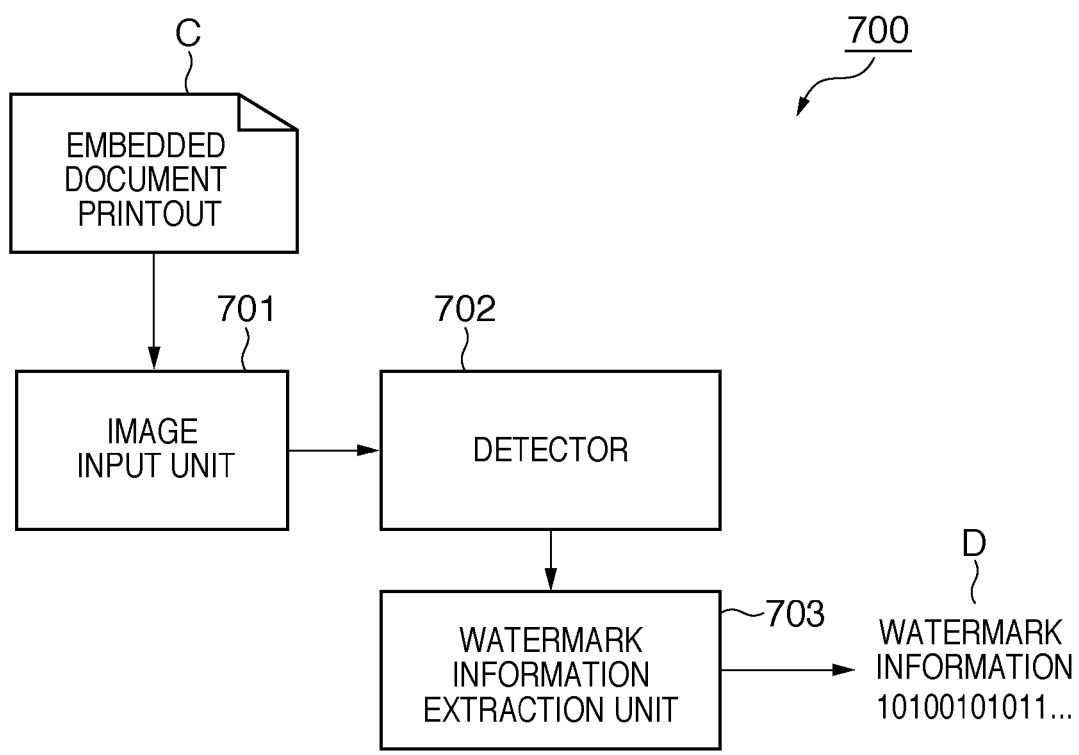
FIG. 7 is a functional block diagram of a watermark information extracting apparatus according to first and second embodiments of the present invention.

FIG. 7 is a functional block diagram of a watermark information extracting apparatus (information processing apparatus) 700 according to the first embodiment of the present invention.

The embedded document printout C is input to an image input unit 701. A detector 702 analyzes the positional relationship of characters from the document image that has been input to the image input unit 701. A watermark information extraction unit 703 extracts and outputs watermark information D that has been embedded in the positional relationship of the characters (the size relationship of the character spacings).

Figure 8:
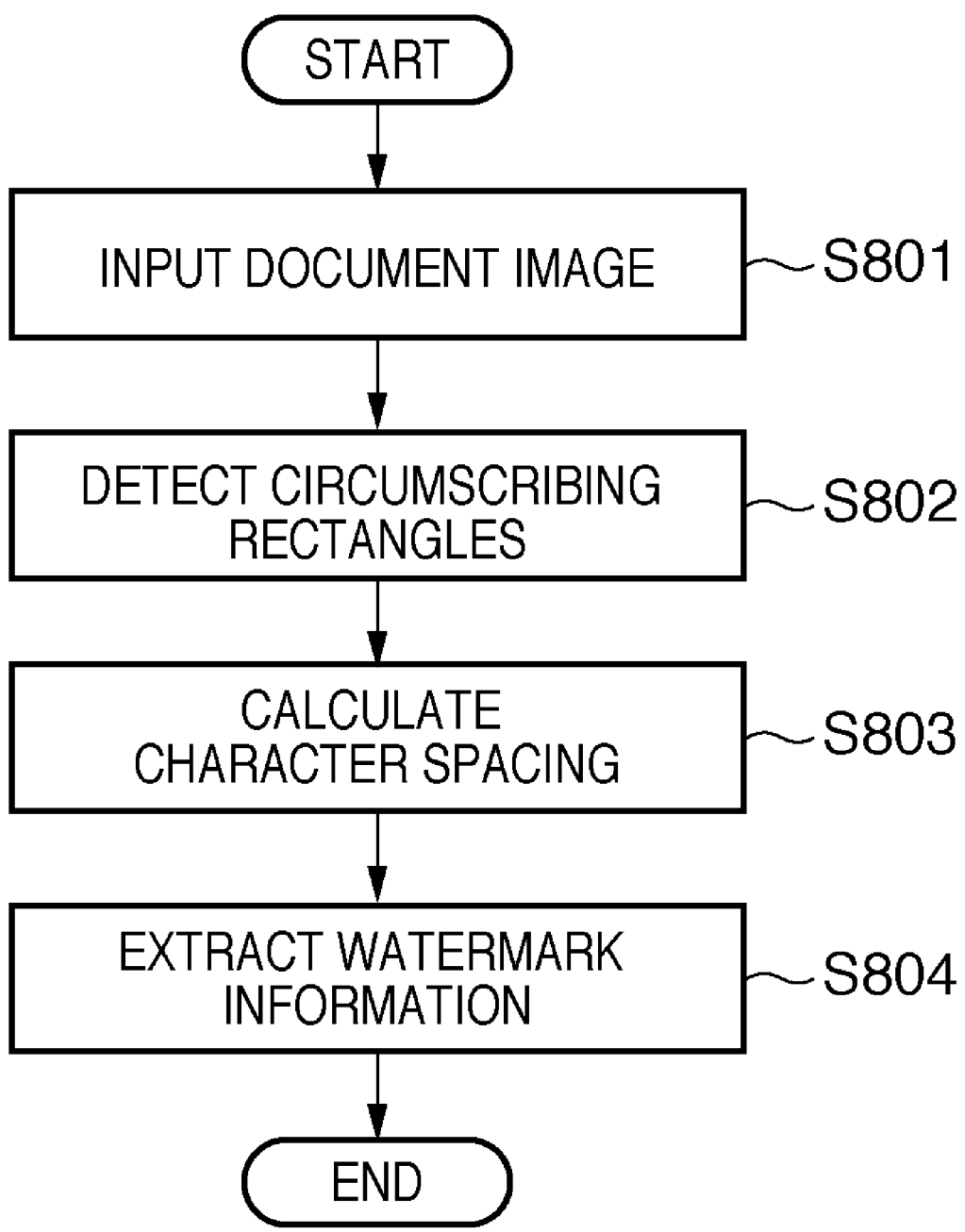
FIG. 8 is a flowchart illustrating the procedure of operations performed by a watermark information extraction unit of the first embodiment.

FIG. 8 is a flowchart illustrating the procedure of operations performed by the watermark information extraction unit 703.

First, in step S801, a document image in which watermark information has been embedded is input. The document image of the embedded document printout C is read in from the image input unit 701, such as a scanner.

Circumscribing rectangles are detected from the document image by the detector 702 in step S802. Next, character spacing is calculated from the circumscribing rectangles by the detector 702 in step S803. The calculation can be performed through a procedure similar to the processing for embedding watermark information. Finally, in step S804, watermark information is extracted by the watermark information extraction unit 703. In the extraction processing, one bit of information ("0" or "1") is extracted one set of spacings at a time based upon the size relationship based upon the set of spacings P, S preceding and succeeding the rectangle of interest.

In accordance with this embodiment, watermark information is embedded in the electronic document data after character-spacing information of the document image is reflected in the electronic document data. Accordingly, watermark information is embedded in the electronic document data by manipulating the character spacing thereof and the watermark information can be extracted from the print document.

Further, character-spacing error is less likely to occur and amount of processing is less in comparison with a case where embedding is performed in a document image, processing such as block selection or OCR is executed and the processed document image is converted to electronic document data.

In this embodiment, the embedding of watermark information is carried out after electronic document data is modified using normalization information. However, the embedding of watermark information may be performed directly, without normalization, based upon the character-spacing relationship of the document image.

In this embodiment, the processes from calculation of normalization information to embedding of watermark information are executed over the entire document. However, each process may be executed line by line of the document. This enables a reduction in the storage area for storing results of processing.

In this embodiment, a method of embedding watermark information by adjusting character spacing is described. However, the present invention is applicable also to a method of embedding watermark information by adjusting line spacing. In such case, although the circumscribing rectangles of characters are adopted as constituent images to be processed in this embodiment, it will suffice if a circumscribing rectangle in which the characters on one line are included is adopted as the constituent image to be processed.

Further, the present invention can also be applied to a case where the spacing between a figure and a character or the spacing between figures is adjusted, not just the spacing between characters or between lines. Further, the present invention can also be applied to a scheme in which watermark information is embedded by changing the sizes of figures or characters or adjusting the positions thereof, not just by embedding information through adjustment of spacing.

Modification of First Embodiment

In the first embodiment, the normalization information calculation unit 104 selects the set of character spacings P and S from a document image one after another and calculates normalization information. However, as illustrated in FIG. 17, there are also cases where character areas (1701*a*, 1701*b*) in which page description data (1701) is recognized differ from character areas (1702*a*, 1702*b*) in which a document image (1702) is recognized. One example of a cause that can be mentioned is a case where the result of block selection is such that part of a diagram is recognized erroneously as characters, as at 1702*c*. In such case normalization will be performed using character spacings that do not exist in the page description data. As a consequence, watermark information cannot be embedded.

Accordingly, normalization information is calculated only with regard to lines having coordinates that agree with the coordinates of lines on which character codes exist in the page description data. This means that the probability that watermark information will be embedded on each line of page description data will rise.

Figure 16:
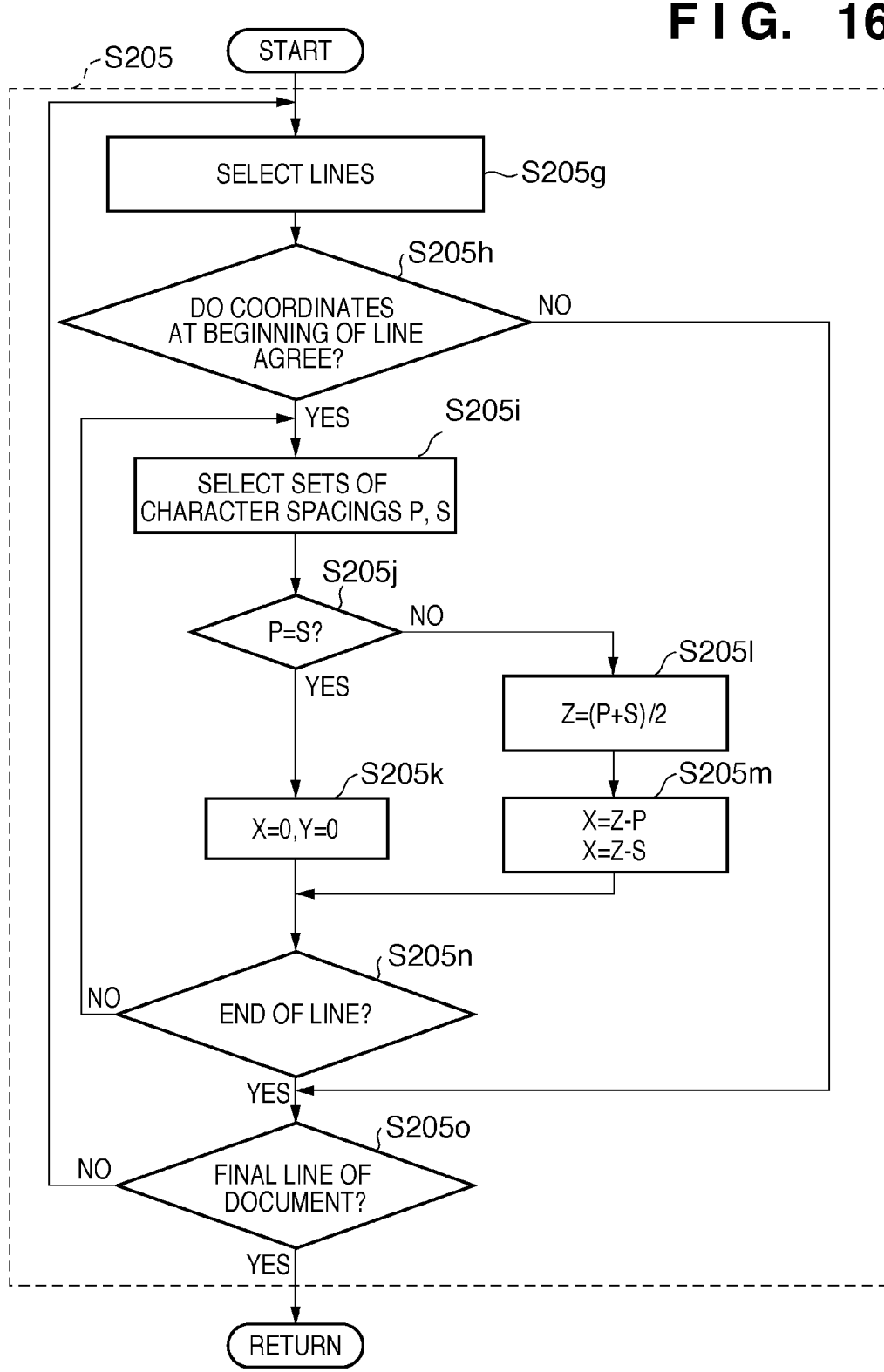
FIG. 16 is a flowchart illustrating the procedure of operations performed by the normalization information calculation unit according to a modification of the first embodiment.

FIG. 16 is a flowchart illustrating the procedure of operations performed by the normalization information calculation unit 104 according to a modification of the first embodiment. The processes of steps S205*j* to S205*m* in FIG. 16 are similar to the processes of steps S205*b* to S205*e* of FIG. 4 and need not be described again.

First, in step S205*g*, lines of a document image are selected. For example, lines are selected one after another starting from a line at the upper right of the document image.

In step S205*h*, it is determined whether a line having coordinates that agree with the coordinates at the beginning of a line selected in step S205*g* exists in the page description data. For example, the coordinates at the beginning of a line in the document image are the coordinates of the character at the beginning of a line as at 1702*d* in FIG. 17 (horizontal coordinate=741, vertical coordinate=5585, etc.). On the other hand, the coordinates at the beginning of a line in the page description data are indicated by the numbers at the beginning of a line on which character codes exist, as at 1701*d* in FIG. 17 (horizontal coordinate=729, vertical coordinate=5584, etc.). Here the unit of the coordinates is a pixel in both the document image and page description data. It should be noted that the coordinates of a portion corresponding to a picture as at 1701*c* in FIG. 17 where character codes do not exist are excluded. As a result, it is possible to embed watermark information only in character portions. However, depending upon the type of page description data, cases where coordinates have also been assigned only to character portions are conceivable. In such cases all coordinates in the page description data should undergo discrimination.

In the determination as to whether coordinates agree, it is conceivable that some error will be produced in the coordinates of page description data and coordinates of the document image owing to the method of generating the document image. Taking error into consideration, for example, if the difference between coordinates is less than 20, therefore, lines are determined to be the same. It can be determined that horizontal coordinate=741, vertical coordinate=5585 of the document image 1702 and horizontal coordinate=729, vertical coordinate=5584 of the page description data 1701 agree in FIG. 17, taking error into consideration, and therefore it will be understood that the line exists.

Further, coordinate data of each line of the page description data is acquired in its entirety at the time of reading of page description data at step S201, and the coordinate data is held in a memory, etc., in advance. However, the coordinate data may be searched for sequentially at the processing of step S205*h*.

If a line is found to exist in step S205*h*, then sets of character spacings P and S are selected successively from the beginning of the line at step S205*i* and each of the processes from step S205*j* to step S205*m* is executed in accordance with the case. In step S205*n*, it is determined whether this is the end of the line. Processing is executed up to the end of the line and control proceeds to step S205*o*. Whether the end of the document has been reached is determined in step S205*o*. Control proceeds to step S205*g* if the end of the document has not been reached, and step S205 is exited if the end of the document has been reached.

If it is determined in step S205*h* that a line does not exist, then control proceeds to step S205*o*.

Second Embodiment

In the first embodiment, the modification unit 105 modifies the characters in the page description data by normalization information from the document image unconditionally regardless of what the characters are. As a consequence, if the page description data contains a mixture of characters and punctuation marks, the character spacings preceding and succeeding the punctuation marks will also be modified and the document therefore may have an unnatural appearance.

Figure 9:
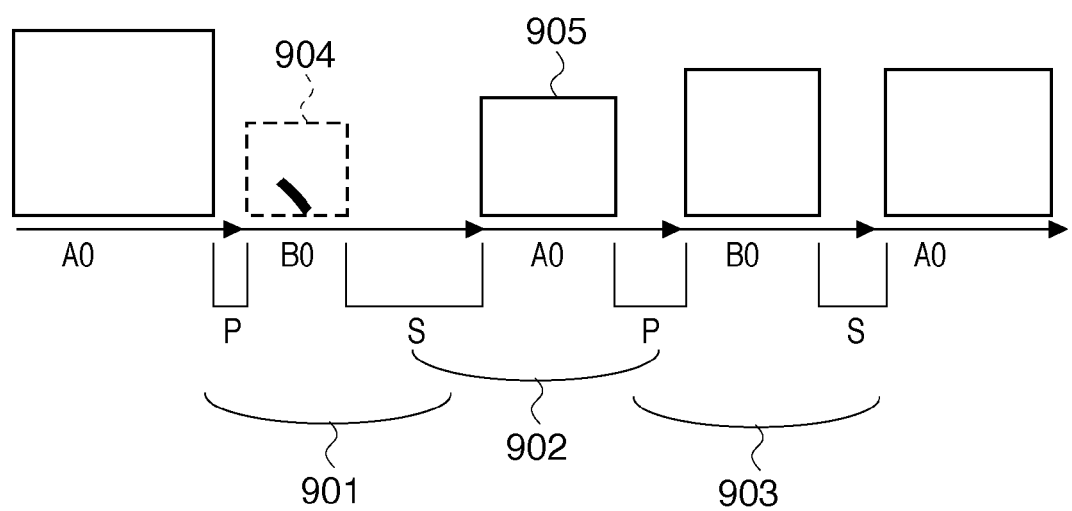
FIG. 9 is a diagram illustrating an example of a set of character spacings preceding and succeeding punctuation marks.

FIG. 9 is a diagram illustrating an example of a set of character spacings preceding and succeeding punctuation marks. This embodiment differs from the first embodiment in that no modification is applied to a set of character spacings that include a character spacing immediately following a punctuation mark, and in that watermark information is not embedded in this set of character spacings.

For example, a set of character spacings P, S that includes character spacing S immediately following a rectangle of interest 904, and a set of distances A0, B0 to the next characters corresponding to the set of character spacings is represented by 901 and 902. Watermark information is not embedded in this set of character spacings. Further, when extracting watermark information, extraction is performed with the exclusion of a set of character spacings preceding and succeeding a circumscribing rectangle not subjected to embedding.

The information embedding apparatus according to the second embodiment has a configuration similar to that of the first embodiment described above. However, the processing executed by the modification unit 105 (step S206) and by the embedding unit 107 (step S207) differs from the processing of the first embodiment in terms of the points set forth below.

[Modification Unit 105 (Step S206)]

Figure 10:
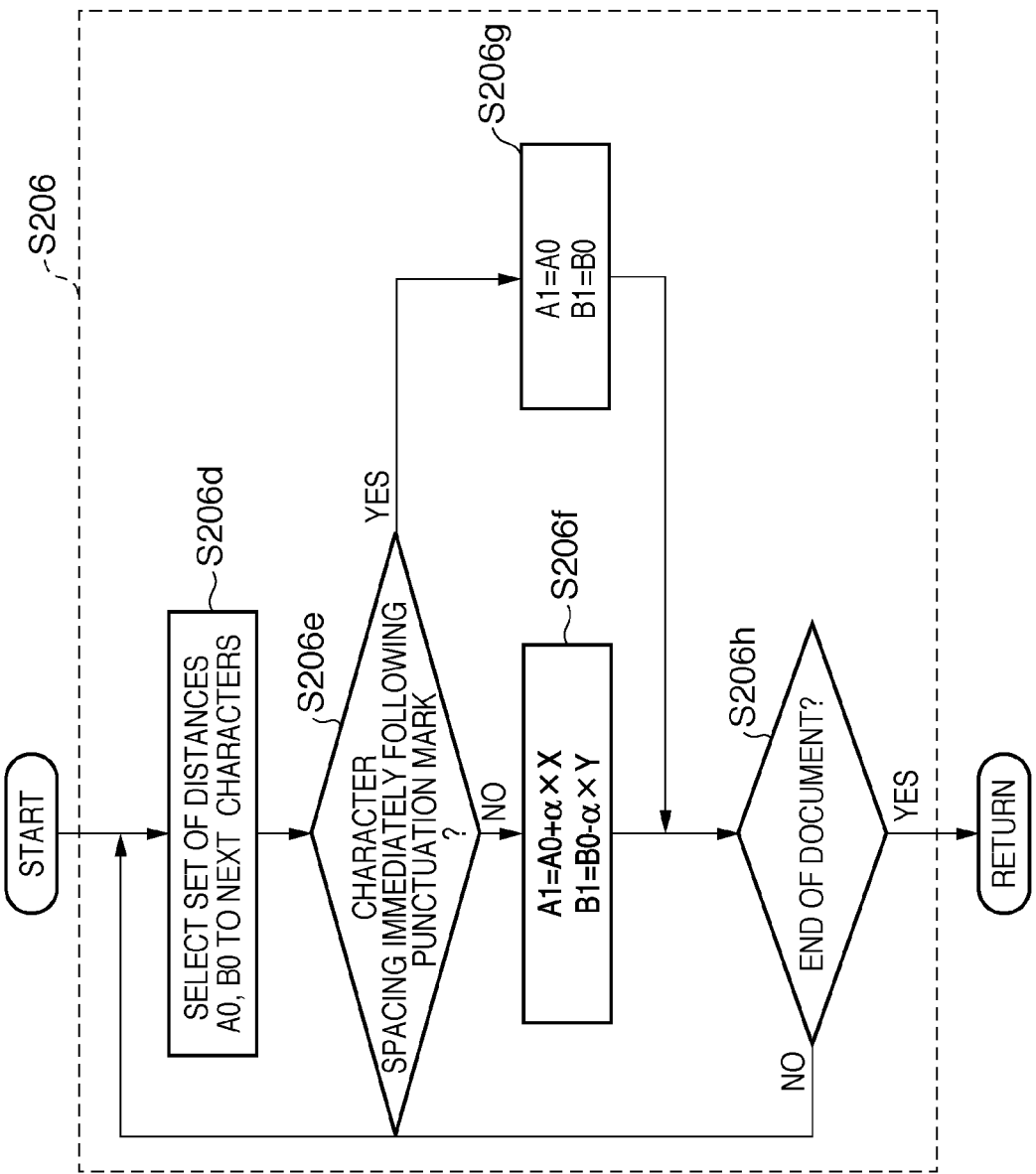
FIG. 10 is a flowchart illustrating the procedure of operations performed by the modification unit according to the second embodiment.

FIG. 10 is a flowchart illustrating the procedure of operations performed by the modification unit 105 according to the second embodiment.

First, in step S206d, the modification unit 105 selects the distances A0, B0 to the next characters, which constitute character information corresponding to the set P, S of preceding and succeeding character spacings.

Next, in step S206e, based upon punctuation-point position information of electronic document data A, it is determined whether A0 or B0 is distance to the next character corresponding to a character spacing that immediately follows a punctuation point. The punctuation-point position information is indicated by, for example, character codes. If it is determined in step S206e that A0 or B0 is not distance to the next character corresponding to a character spacing that immediately follows a punctuation point, control proceeds to step S206f. If it is determined in step S206e that A0 or B0 is distance to the next character corresponding to a character spacing that immediately follows a punctuation point, control proceeds to step S206g.

Next, in step S206f, distances A1, B1 to the next characters after modification are calculated as A1=A0+α×X, B1=B0+α×Y, respectively, and the data content is modified.

In step S206g, on the other hand, the operations A1=A0, B1=B0 are performed. That is, the data content is not modified.

Finally, in step S206h, it is determined whether the character information corresponding to P, S is the final character information. Step S206 is exited if it is determined in step S206h that the character information is the final character information, and control returns to step S206d if it is determined in step S206h that the character information is not the final character information.

[Embedding Unit 107 (Step S207)]

Figure 11:
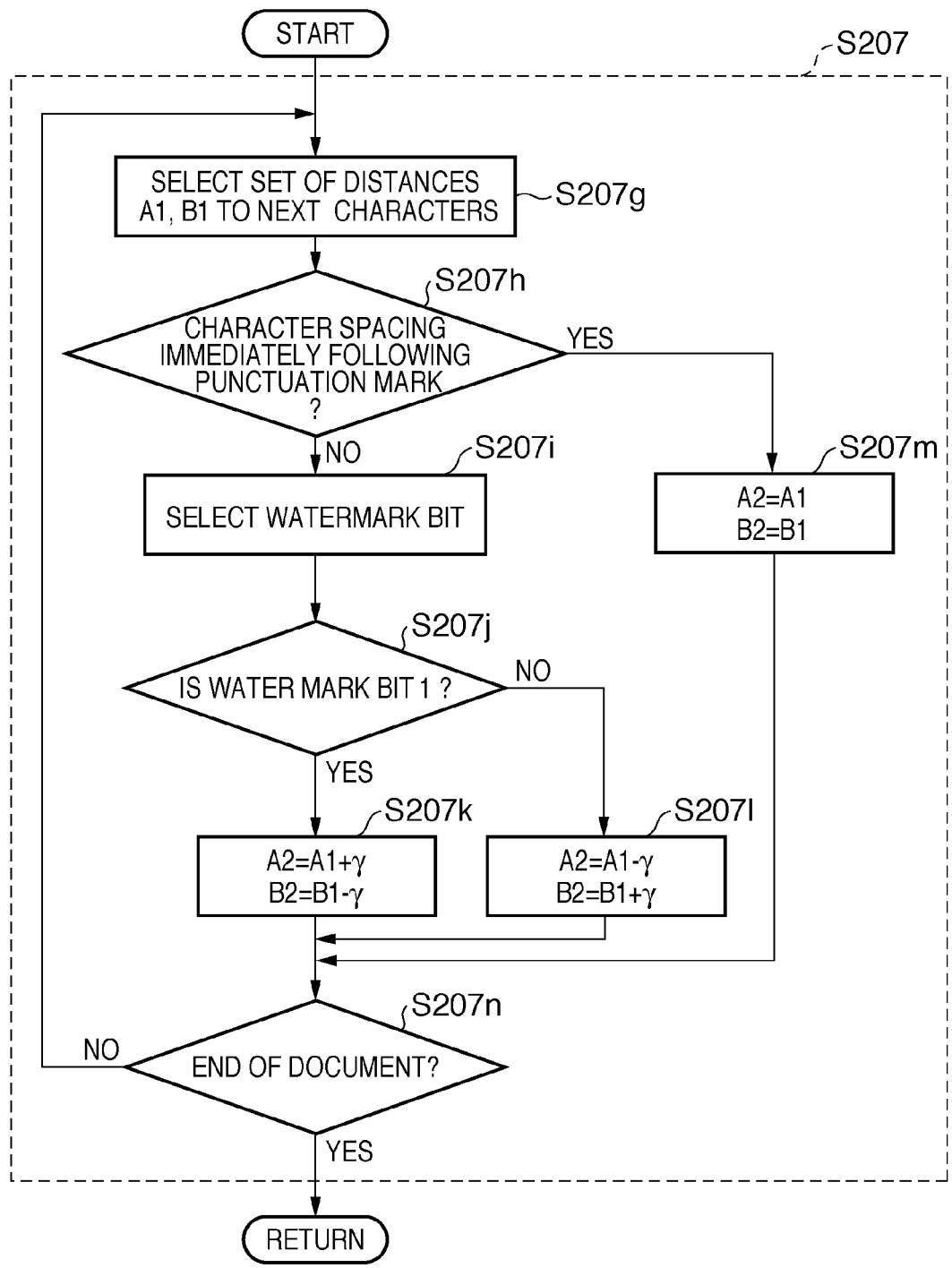
FIG. 11 is a flowchart illustrating the procedure of operations performed by an embedding unit according to the second embodiment.

FIG. 11 is a flowchart illustrating the procedure of operations performed by the embedding unit 107 according to the second embodiment.

First, in step S207g, distances A1, B to the next characters are selected.

In step S207h, based upon punctuation-point position information of the electronic document data A, it is determined whether A1 or B1 is distance to the next character corresponding to a character spacing that immediately follows a punctuation point. If it is determined in step S207h that A1 or B1 is not distance to the next character corresponding to a character spacing that immediately follows a punctuation point, control proceeds to step S207i. If it is determined in step S206h that A1 or B1 is distance to the next character corresponding to a character spacing that immediately follows a punctuation point, control proceeds to step S207m.

A watermark bit to be embedded is selected in step S207i. Next, in step S207j, it is determined whether the embedded watermark is a "1". If it is determined in step S207j that the embedded watermark bit is "1", then control proceeds to step S207k. If it is determined in step S207j that the embedded watermark bit is not "1", then control proceeds to step S207l.

In step S207k, distances A2, B2 to the next characters after embedding are calculated as A2=A1+γ, B2=B2−γ, respectively, in such a manner that the character spacing corresponding to A1 will become larger than the character spacing corresponding to B1. Embedding of the watermark information is then carried out. In step S207l, on the other hand, distances A2, B2 up to the next characters after embedding are calculated as A2=A1−γ, B2=B2+γ, respectively, in such a manner that the character spacing corresponding to A1 will become smaller than the character spacing corresponding to B1. Embedding of the watermark information is then carried out.

In step S207m, on the other hand, the operations A2=A1, B2=B1 are performed. That is, embedding of watermark information is not carried out.

Finally, in step S207n, it is determined whether the character information in the page description data is the final information. Step S207 is exited if it is determined in step S207n that the character information in the page description data is the final information, and control returns to step S207g if it is determined in step S207n that the character information in the page description data is not the final information.

Figure 12:
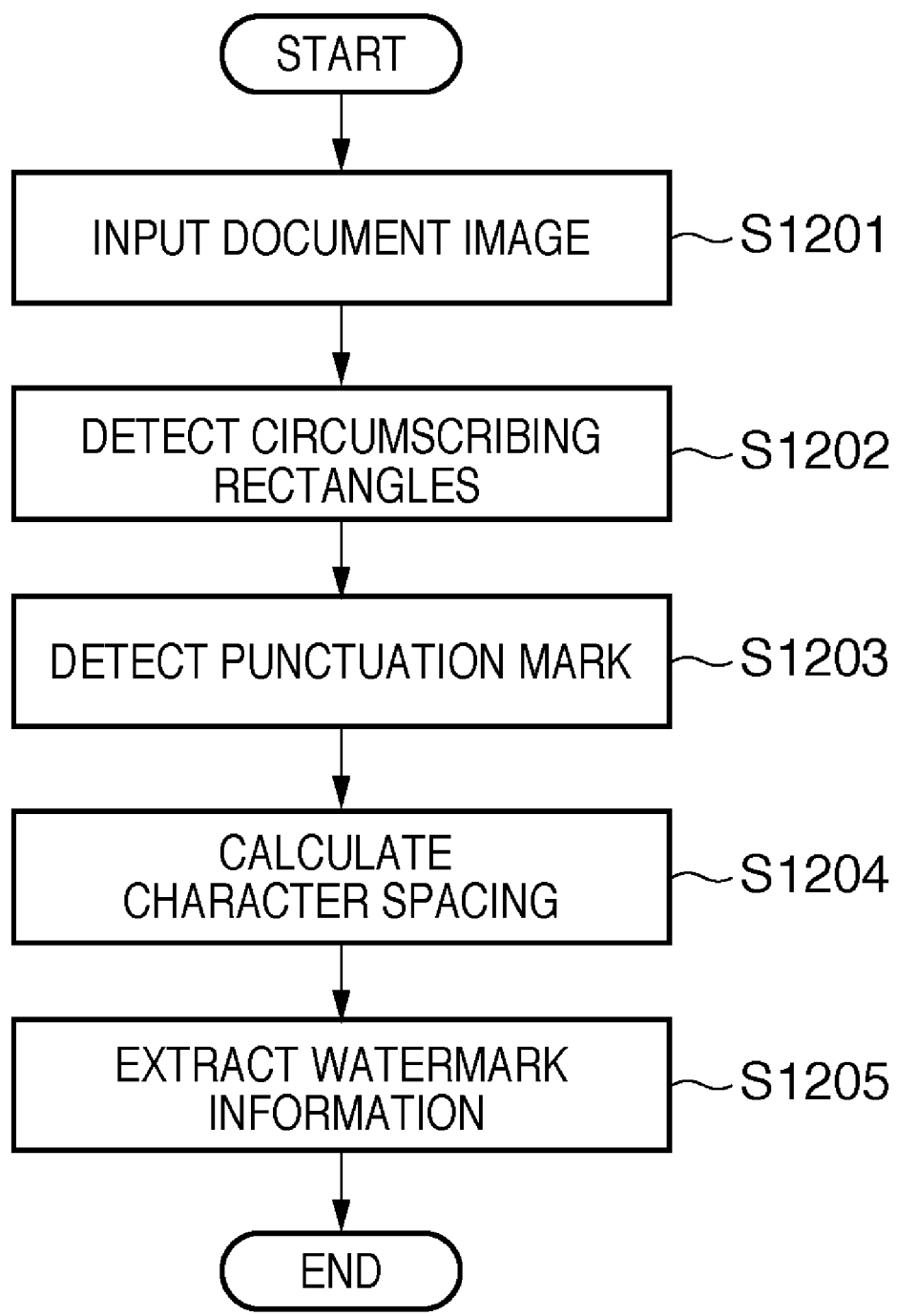
FIG. 12 is a flowchart illustrating the procedure of operations performed by the watermark information extraction unit of the second embodiment.

FIG. 12 is a flowchart illustrating the procedure of operations performed by the watermark information extraction unit 703 according to the second embodiment. Although the watermark information extracting apparatus 700 is similar to that of the first embodiment, processing relating to punctuation marks is added to the extraction processing.

First, in step S1201, a document image in which watermark information has been embedded is read in. The document image is input from the image input unit 701, such as a scanner.

Circumscribing rectangles are detected from the document image in step S1202, and a punctuation mark is detected based upon the sizes, etc., of the circumscribing rectangles in step S1203. The processing of steps S1202 and S1203 is executed by the detector 702.

In step S1204, the detector 702 calculates character spacing with the exception of the set of character spacings that includes the character spacing immediately following the punctuation mark. The method of calculation is similar to that of the processing executed by the embedding unit 107.

In step S1205, watermark information is extracted by the watermark information extraction unit 703. In the extraction processing, one bit of information ("0" or "1") is extracted one set of spacings at a time based upon the size relationship of the set of character spacings P, S preceding and succeeding the rectangle of interest.

In the first and second embodiments described above, watermark information is embedded by adjusting the size relationship of preceding and succeeding character spacings. However, in a case where it is determined whether or not to insert watermark information by comparing each character spacing with a threshold value, the present invention can be applied merely by adding only information concerning each corresponding character spacing within the document image.

Third Embodiment

Figure 13:
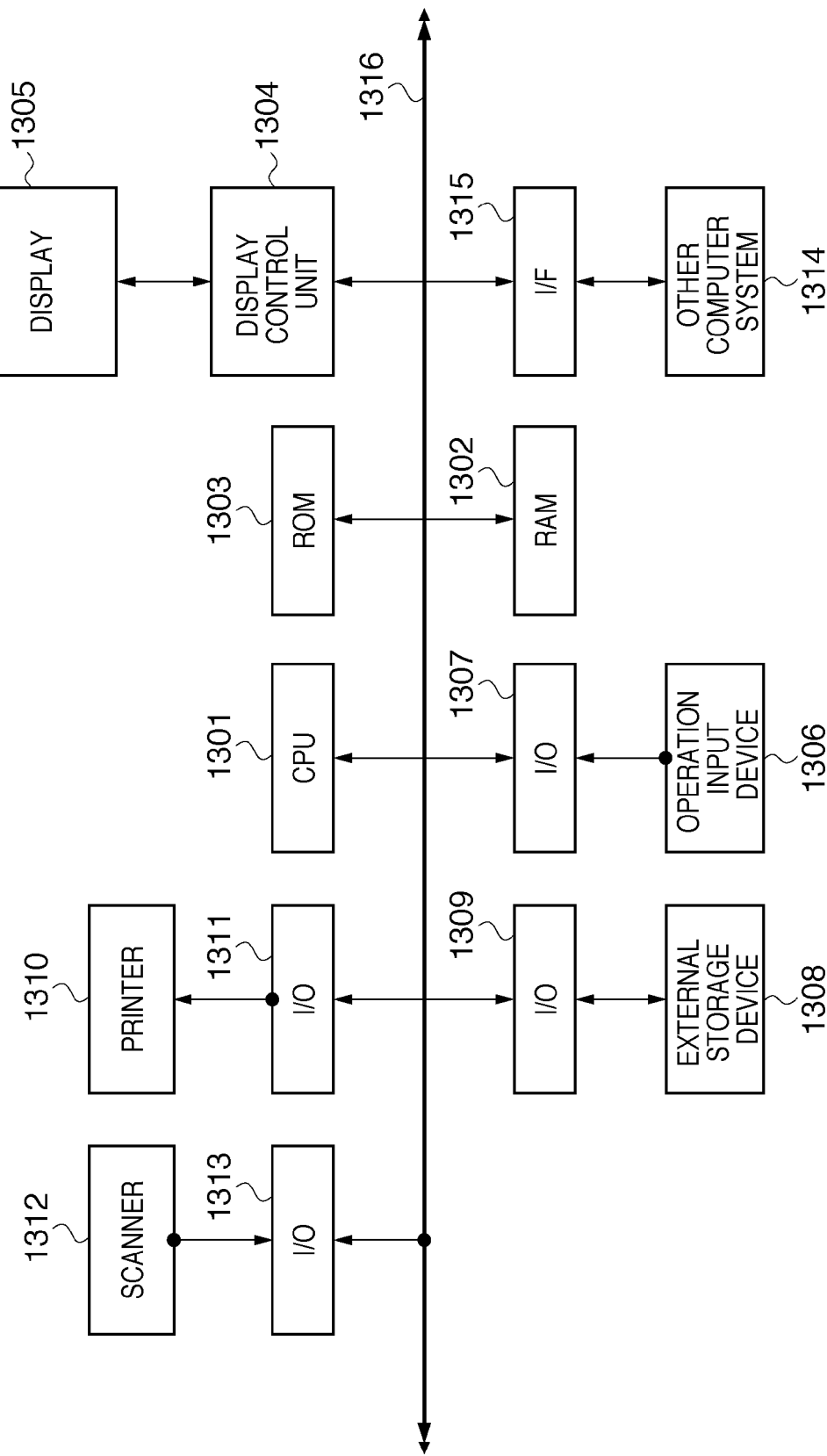
FIG. 13 is a basic block diagram of a computer according to a third embodiment of the present invention.

In this embodiment, a computer is adapted to execute the various processing according to the first embodiment. FIG. 13 is a basic block diagram of a computer according to a third embodiment of the present invention. In a case where all of the functions are executed by computer, each functional constituent is expressed by a computer program and the computer is caused to read in the program, whereby all functions of the first embodiment can be implemented.

A CPU 1301 controls the overall computer using the computer program and data that have been stored in a RAM 1302 or ROM 1303. The CPU 1301 executes each of the processes described in the first embodiment.

The RAM 1302 has a storage area for temporarily storing a computer program and data read in from an external storage device 1308 or a program and data downloaded from another computer system 1314 via an interface 1315. The RAM 1302 further has a processing area necessary in order that the CPU 1301 may execute various processing.

The ROM 1303 stores the function program of the computer and settings data, etc. A display control unit 1304 executes control processing for displaying images and characters, etc., on a display 1305. The display 1305, which is a display device such as a CRT or liquid crystal panel, displays images, characters and the like.

An operation input device 1306 comprises devices such as a keyboard and mouse and is capable of inputting various commands to the CPU 1301. An input/output interface 1307 notifies the CPU 1301 of various commands, etc., that have been input via the operation input device 1306.

The external storage device 1308 functions as a large-capacity information storage device such as a hard disk and stores an operating system, computer programs for causing the CPU 1301 to execute the processing according to each embodiment described above, and input/output document images. The writing and reading of information to and from the external storage device 1308 is carried out via an input/output interface 1309.

A printer 1310 outputs documents and images. Output data is transmitted from the RAM 1302 or external storage device 1308 via an input/output interface 1311. Examples of printers that can be mentioned are an ink-jet printer, laser printer, thermal-transfer printer and dot-impact printer, etc.

A scanner 1312 reads documents and images. Input data is transmitted to the RAM 1302 or external storage device 1308 via an input/output interface 1313.

A bus 1316 forms a network by connecting the CPU 1301, ROM 1303, RAM 1302, input/output interfaces 1311 and 1309, display control unit 1304, interface 1315 and input/output interfaces 1307 and 1313.

In this embodiment, the computer executes processing with the exception of the processing performed by the scanner and printer. However, the processing executed by the computer may be executed instead by the scanner and printer by using special-purpose hardware circuitry provided within the scanner and printer.

It should be noted that the first to third embodiments merely illustrate concrete examples for practicing the present invention and that the technical scope of the present invention should not be interpreted restrictively based upon these examples. That is, the present invention can be practiced in various forms without departing from the technical idea of the invention and its principal features.

Other Embodiments

The present invention may be applied to a system constituted by a plurality of devices (e.g., a host computer, interface, reader, printer, etc.) or to an apparatus comprising a single device (e.g., a copier or facsimile machine, etc.).

In the foregoing embodiments, a system or apparatus is supplied with a computer-readable recording medium (or storage medium) on which program code of software for implementing these functions has been recorded. In this case, it goes without saying that the object of the invention is attained also by having a computer (or a CPU or MPU) of the system or apparatus read and execute the program code that has been stored on the recording medium. In this case, the program code per se read from the recording medium implements the functions of the foregoing embodiments and the recording medium storing the program code constitutes the present invention.

Further, the present invention also covers a case where an operating system or the like running on the computer performs a part of or the entire actual process based upon the designation of program code and implements the functions according to the embodiments by this processing.

It goes without saying that the present invention further covers a case where, after the program code read from the recording medium are written to a memory provided on a function expansion card inserted into the computer or provided in a function expansion unit connected to the computer, a CPU or the like provided on the function expansion card or function expansion unit performs a part of or the entire actual process based upon the designation of program code and implements the functions of the above embodiments by this processing.

In a case where the present invention is applied to the above-mentioned recording medium, program code corresponding to the flowcharts and functional constituents described earlier is stored on the recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-265826, filed on Oct. 11, 2007 and 2008-237188 filed on Sep. 16, 2008, which are hereby incorporated by reference herein in their entirety.

What is claimed is:

1. An information processing apparatus for embedding information in electronic document data that has been input thereto, comprising:
an image generating unit that analyzes electronic document data described in a predetermined page description language, and generates a document image from the electronic document data in accordance with the analysis;
a detecting unit that detects layout information of each constituent image in the generated document image;
a determining unit that, using the detected layout information, determines whether or not a coordinate substantially agreeing with a coordinate of a beginning of a line in the generated document image exists as a coordinate of a character in the electronic document data;
a calculating unit that, (1) if said determining unit determines that the coordinate substantially agreeing with the coordinate of a beginning of a line in the generated document image exists as the coordinate of a character in the electronic document data, calculates normalization information, which is for normalizing placement of each constituent image belonging to the line in the document image, based upon the detected layout information, and,
(2) if said determining unit determines that the coordinate substantially agreeing with the coordinate of a beginning of a line in the generated document image does not exist as the coordinate of a character in the electronic document data, excludes the line in the generated document image from the subject to be calculated for the normalization information; and an embedding unit that modifies the electronic document data based upon the calculated normalization information and embeds information in the modified electronic document data.

2. The apparatus according to claim 1, wherein said image generating unit generates the document image at a resolution at which the layout information is capable of being detected by said detecting unit.

3. The apparatus according to claim 2, wherein the layout information includes information relating to position and size of each constituent image; and said calculating unit calculates spacing of each constituent image based upon the layout information.

4. The apparatus according to claim 3, wherein each constituent image is a circumscribing rectangle of each character image; and said detecting unit calculates spacing of the circumscribing rectangle of each character image.

5. The apparatus according to claim 4, wherein on the basis of character spacing calculated by said detecting unit, said calculating unit calculates an average value of character spacings between a rectangle of interest, which is a circumscribing rectangle of interest, and circumscribing rectangles adjacent to the rectangle of interest, and calculates normalization information necessary in order that each character spacing will attain the average value.

6. The apparatus according to claim 5, wherein when modifying the electronic document data, said embedding unit modifies information corresponding to at least one of position and size of the circumscribing rectangle.

7. The apparatus according to claim 6, further comprising a unit for modifying the electronic document data in such a manner that it will correspond to the normalization information calculated in view of the document image.

8. The apparatus according to claim 7, wherein said embedding unit embeds information by adjusting character spacing of each character in the electronic document data based upon predetermined information.

9. An information processing method of embedding information in electronic document data that has been input, comprising:

an image generating step of analyzing electronic document data described in a predetermined page description language, and generating a document image from the electronic document data in accordance with the analysis;

a detecting step of detecting layout information of each constituent image in the generated document image;

a determining step of determining, using the detected layout information, whether or not a coordinate that substantially agrees with a coordinate of a beginning of a line in the generated document images exists as a coordinate of a character in the electronic document data;

a calculating step of, (1) if it is determined in said determining step that the coordinate substantially agreeing with the coordinate of a beginning of a line in the generated document image exists as the coordinate of a character in the electronic document data, calculating normalization information, which is for normalizing placement of the constituent images belonging to the line in the document image, based upon the detected layout information, and, (2) if it is determined in said determining step that the coordinate substantially agreeing with the coordinate of a beginning of a line in the generated document image does not exist as a coordinate of a character in the electronic document data, excluding the line in the generated document image from the subject to be calculated for the normalization information; and an embedding step of modifying the electronic document data based upon the calculated normalization information and embedding information in the modified electronic document data, wherein said method is executed in an information processing apparatus comprising a CPU and a memory.

10. A non-transitory computer-readable recording medium storing a computer program which, by being read in by a computer, causes the computer to function as the information processing apparatus set forth in claim 1.

* * * * *